United States Patent Office 3,232,752
Patented Feb. 1, 1966

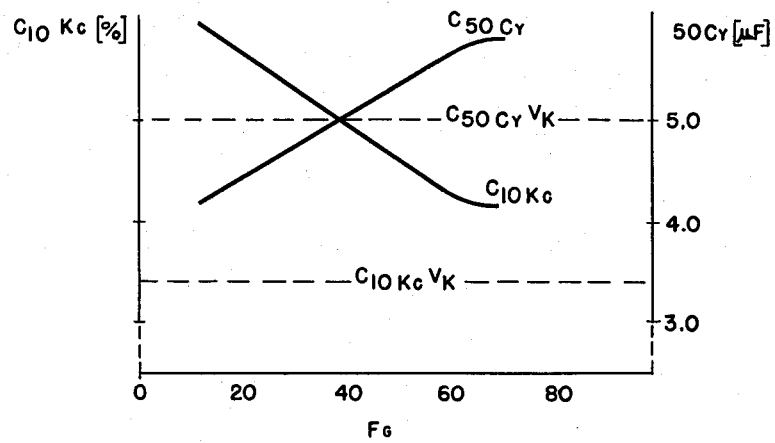

3,232,752
METHOD OF PRODUCING SINTERED TANTALUM ANODE BODIES FOR ELECTROLYTIC CAPACITORS
Egon Klöpping, Heidenheim, Germany, assignor to Siemens & Halske Aktiengesellschaft, Berlin and Munich, Germany, a corporation of Germany
Filed June 11, 1963, Ser. No. 287,143
Claims priority, application Germany, June 13, 1962, S 79,893
2 Claims. (Cl. 75—200)

The present invention relates to a method of producing sintered tantalum anode bodies for electrolytic capacitors of high specific capacitance per unit of volume and only a slight decrease in capacitance at higher frequencies, employing powdered tantalum as the initial material.

It is already known to use, instead of film forming metal foils, sintered bodies as electrodes, particularly as anodes for electrolytic capacitors of particularly high capaictance per unit volume. These sintered bodies are produced by pressing powdered film forming metal, particularly powdered tantalum, followed by sintering at temperatures of about 2000° C. The sintered anode bodies formed in this manner are arranged either together with an electrolyte, for instance sulphuric acid, in a housing which also serves as cathode and consists as a rule of silver, or, in the case of dry electrolytic capacitors, they are coated with a semiconductor layer, for instance manganese dioxide, which takes the place of the electrolyte, over which is applied a layer of graphite, and on the latter is applied a metallic current lead, for instance by volatilizing or metallizing with copper, zinc or a lead-tin alloy. These dry electrolyte capacitor bodies are as a rule disposed in suitable housings or envelopes.

It is already known that the properties of an electrolytic capacitor, the anode of which is made of a sintered body, depend to a far-reaching extent on the selection of the particle size of the powder, on the molding pressure employed in producing the anode body before the sintering, and on the sintering temperature. Thus, in particular, it is also known that when using a very finely granular powder, there is obtained a particularly high capacitance yield, while a low loss angle can be obtained when a coarse powder is used.

In order to obtain a high capacitance per unit of volume and also a low loss angle, it is already known to use a powder of uniform particle size in order to prevent clogging of the pores.

On the other hand, it is also known to use for the production of the anode bodies a powder which contains both coarse and fine powder particles, for example, in the distribution obtained upon the preparation of the powder.

It has been found in the course of detailed investigations that particularly favorable results can be obtained by using, in accordance with the invention, for the production of the anode bodies, tantalum powder consisting of a mixture of a coarse powder in a particle size range of particle diameters of 75 to 250 $\mu$m. and a fine powder in a particle size range of particle diameters of 0.2 to 10 $\mu$m. Such a powder permits the production of anode bodies of extremely high capacitance per unit volume.

A particular advantage of the anode bodies produced in this manner resides in that the capacitance measured at low frequencies drops only slightly as compared with other known electrolytic capacitors of this type, when using the capacitor at higher frequencies. In order to obtain, on the one hand, a high volumetric capacitance and on the other hand only a slight decrease of this capacitance at higher frequencies, it has proven advantageous for the percentage of fine powder to be 10 to 50 percent.

It is moreover advantageous to select the sintering temperature within the range of between 1700 and 2000° C.; if higher sintering temperatures are used, the particles of the fine powder sinter together and the volumetric capacitance is thus reduced.

Further details of the invention are described below with reference to the accompanying drawing.

The drawing shows a graph indicating measured results obtained on tantalum sintered anode bodies formed of mixtures of fine and coarse powder.

There was employed a coarse powder of a particle size range with particle diameters of between 75 and 250 $\mu$m., and a maximum of the distribution curve at about 150 $\mu$m., and a fine powder in a particle size range having particle diameters of between 0.2 and 10 $\mu$m., with a maximum of the distribution curve at a few $\mu$m. The sintering was effected at 1800° C. The measurements were compared with measurements on electrolytic capacitors having tantalum anodes which had been prepared by sintering ordinary types of powder of high capacitance. The measured anode bodies had a diameter of 2.7 mm. and a length of 7 mm. They were formed to a voltage of 200 volts.

On the $x$-axis, there is shown the percentage of fine powder $Fg$ in the powder mixture, while on the $y$-axis on the left-hand side, there is plotted in percent the capacitance measured at 10 kilocycles, as compared to the capacitance measured at 50 cycles, and on the right-hand side the capacitance measured at 50 cycles. For purpose of comparison, the corresponding values of the comparison capacitor VK were also entered. It was found that the capacitance per unit volume of the powder mixture in accordance with the invention, starting with an amount of fine powder of 40 percent, exceeds the volumetric capacitances of the comparative body, while in the entire range the capacitance measured at 10 kilocycles lies substantially above the capacitance of the comparison body.

Changes may be made within the scope and spirit of the appended claims which define what is believed to be new and desired to have protected by Letters Patent.

I claim:
1. A method of producing sintered tantalum anode bodies for electrolytic capacitors having a high specific capacitance per unit of volume and only a slight decrease in capacitance at higher frequencies, comprising using as initial material a tantalum powder consisting of a mixture of a coarse powder in a particle size range having particle diameters of 75 to 250 $\mu$m. and a fine powder in a particle size range having particle diameters of 0.2 to 10 $\mu$m., the powder mixture containing a proportion of fine powder of from 10 to 50 percent, and sintering said tantalum powder mixture.

2. The method according to claim 1, comprising effecting the sintering at a temperature of between 1700 and 2000° C.

References Cited by the Examiner
UNITED STATES PATENTS
1,206,704  11/1916  Helfgott _____ 75—84

OTHER REFERENCES
Goetzel, Treatise on Powder Metallurgy, vol. 2, Interscience Publishers, Inc., N.Y., 1950, pp. 42–52.
Mundinger et al.: The Application of Ultra-Fine Particles in Tungsten Powder Metallurgy, Atomic Energy Commission Document LAMS–2736, October 1962.

CARL D. QUARFORTH, Primary Examiner.
REUBEN EPSTEIN, Examiner.